United States Patent

[11] 3,599,667

| | | |
|---|---|---|
| [72] | Inventor | Arthur M. Kaser<br>Plainfield, N.J. |
| [21] | Appl. No. | 800,145 |
| [22] | Filed | Feb. 18, 1969 |
| [45] | Patented | Aug. 17, 1971 |
| [73] | Assignee | Filter Dynamics International Inc.<br>Edison, N.J. |

[54] VENTILATION CONTROL VALVE
5 Claims, 7 Drawing Figs.

[52] U.S. Cl. .................................................... 137/480,
137/504, 137/519, 123/119, 251/205
[51] Int. Cl. .................................................... F16k 17/04
[50] Field of Search ......................................... 137/504,
503, 480, 625.3, 519; 251/205, 121, 122; 123/119 B

[56] References Cited
UNITED STATES PATENTS

| 2,014,314 | 9/1935 | Defenbough | 251/122 |
| 3,365,166 | 1/1968 | Smith | 251/121 |
| 780,986 | 1/1905 | Francis | 137/504 |
| 1,343,375 | 6/1920 | Peppercorn | 251/205 X |
| 3,105,477 | 10/1963 | Lowther | 123/119 B |
| 3,225,752 | 12/1965 | Robinson | 123/119 B |
| 3,308,298 | 3/1967 | Snider | 123/119 B |
| 3,359,960 | 12/1967 | Pittsley | 137/480 X |
| 3,439,703 | 4/1969 | Toda | 123/119 B X |

Primary Examiner—Harold W. Weakley
Attorney—Charles Marks

ABSTRACT: A valve houses a spring-biased poppet having tapered grooves accommodating airflow therethrough from an engine crankcase to the inlet manifold of the engine carburetor. The poppet responds to the vacuum created by engine turnover, thereby retracting the grooves when there is a high vacuum and projecting them when there is a low vacuum.

PATENTED AUG 17 1971 3,599,667

INVENTOR.
ARTHUR M. KASER
BY Charles Marks 3,599,667

VENTILATION CONTROL VALVE

BACKGROUND OF THE INVENTION

1. Field of the Invention

This invention relates generally to valves and is particularly concerned with valves intended to aid in the efficient combustion of air-fuel mixtures in automotive engines and the like.

2. Description of the Prior Art

Heretofore, difficulty has been encountered in effecting the efficient combustion of such mixtures because of the accumulation of air in engine crankcases and the tendency of such air to be drawn into the combustion cylinders during engine operation.

Thus, when the engine is turning over slowly, a high vacuum is created which is communicated to the crankcase and, in conventional engines, urges air therefrom to the cylinders as, for example, by way of ventilation systems provided between the crankcase and the engine air induction system, thereby preventing or interfering with an optimum air-fuel mixture in the cylinders. When the engine is turning over more rapidly, a lower vacuum is created which permits the accumulation of fumes in the crankcase, the said fumes thereafter being communicable to the atmosphere and serving as a major source of air pollution.

The present invention is aimed at solving these problems.

SUMMARY OF THE INVENTION

In the present invention, a valve, which houses a spring-biased poppet, is interposed between the crankcase and the inlet manifold of the carburetor. The poppet is responsive to variations in pressure communicated through the carburetor as a result of variations in engine speed, so that upon the creation of a high vacuum within the combustion cylinders, the poppet is urged to a closed position and, upon the creation of a low vacuum, the poppet is urged to an open position.

The periphery of the poppet is provided with a plurality of tapered grooves which permit the communication of air from the crankcase through the valve and into the intake manifold of the carburetor. When the poppet is in a closed position, the grooves are covered so that such communication cannot be effected. As the vacuum is reduced, the grooves are exposed to permit communication of air from the crankcase through the valve.

Initially, the narrower portions of the grooves are exposed so that the quantity of air introduced therethrough is relatively small but as the vacuum is lowered, wider portions of the grooves are exposed so as to permit the introduction of a larger quantity of air. In this way, at low engine speeds, the crankcase is effectively sealed and at high engine speeds, the crankcase is ventilated and the air is permitted to flow therefrom to the carburetor and thence to the cylinders where it may be utilized as an aid to combustion and where it may be accompanied by any fumes which might otherwise have accumulated in the crankcase.

Thus, it is an object of the present invention to provide means for effecting crankcase ventilation so as to regulate in an efficient manner the flow of air therefrom to the combustion cylinders by way of the carburetor.

Another object of the invention is to provide means for preventing the accumulation of fumes within the crankcase and their subsequent exhaust to the atmosphere.

Another object of the invention is to provide means of the character described whereby efficient closure of the crankcase is effected when the engine is turning over slowly and efficient opening of the crankcase is effected when the engine is turning over more rapidly.

Another object of the invention is to provide means for effecting the efficient combustion of fuels within engine cylinders.

A further object of the invention is to provide a simple, sturdy and compact means of the character described which may be easily manufactured with a minimum number of parts.

Other objects and advantages of the present invention will become apparent from the following discussion when read in conjunction with the accompanying drawing.

BRIEF DESCRIPTION OF THE DRAWING

In the drawing.

Throughout the several views, similar numerals are employed to refer to similar parts of the invention.

DESCRIPTION OF THE PREFERRED EMBODIMENT

Figure 1:
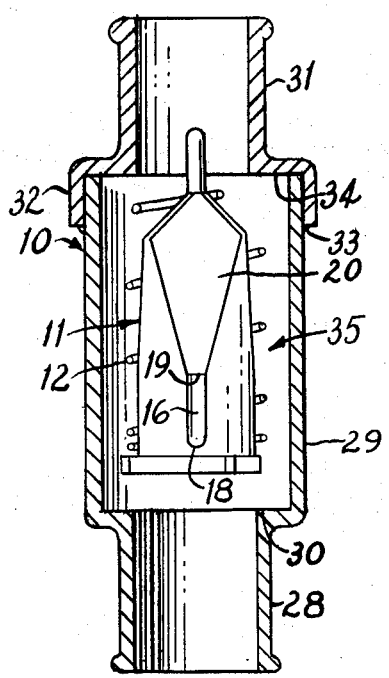
FIG. 1 is a cross-sectional view of the preferred embodiment of the invention, showing the poppet in an open position within the valve housing.
Figures 2, 5:
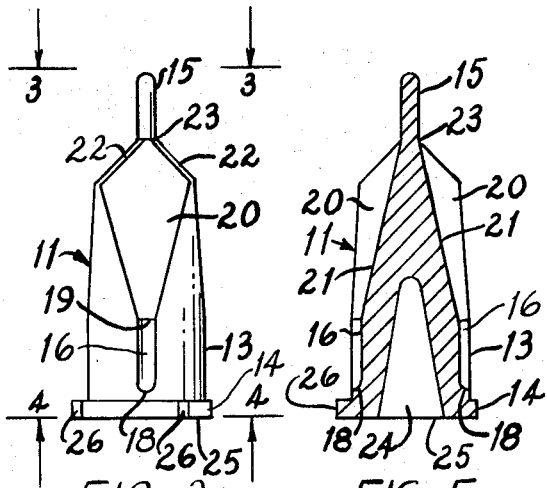
FIG. 2 is a front view of the poppet employed in said embodiment of the invention.
FIG. 5 is a cross-sectional view taken about the line 5–5 of FIG. 4.
Figures 3, 4:
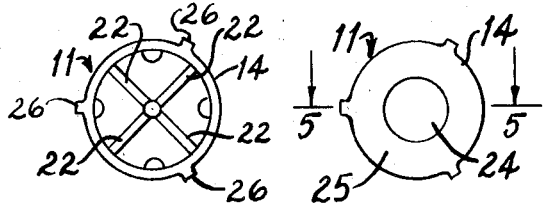
FIG. 3 is a view taken about the line 3–3 of FIG. 2.
FIG. 4 is a view taken about the line 4–4 of FIG. 2.

As shown in FIG. 1 of the accompanying drawing, the preferred embodiment of the valve of the present invention comprises a housing, generally designated by the numeral 10, a poppet, generally designated by the numeral 11, and a coiled compression spring 12.

The poppet 11 is depicted in FIGS. 2 to 5, as well as in FIG. 1. The poppet 11 includes a cylindrical body 13 provided with a lower annular flange 14 and an upper longitudinal extension member 15, said flange 14 and extension member 15 being formed integrally with the cylindrical body 13. The housing 10 and poppet 11 are preferably composed of a rigid, easily molded plastic material, such as a polysulfone plastic, it being understood that they may also be composed of other materials having similar characteristics.

The periphery of the cylindrical body 13 is provided with a plurality of longitudinal grooves 16 of constant cross-sectional area. The lower end 18 of each of the grooves 16 is adjacent to the flange 14; and the upper end 19 of each of the grooves 16 communicates with a tapered groove 20 which flares outwardly towards the upper end of the cylindrical body 13, the base 21 of the tapered groove 20 being inclined from the upper end 19 of each of the grooves 16 toward the longitudinal extension member 15.

With this conformation, it will be seen that although the grooves 16 at the lower portion of the cylindrical body 13 are of constant cross-sectional area, the cross-sectional area of each of the tapered grooves 20 generally increases as the upper end of the cylindrical body 13 is approached thereby.

The upper end of the cylindrical body 13 is chamfered, thereby defining ridges 22 which extend from the outer surface of the cylindrical body 13 to the bottom 23 of the extension member 15.

A tapered cavity 24 is provided in the base 25 of the cylindrical body 13, thereby minimizing the weight of the cylindrical body 13.

The flange 14 is provided with a plurality of radial extensions 26 spaced at equal angular intervals about the said flange 14 and formed integrally therewith.

Figure 6:
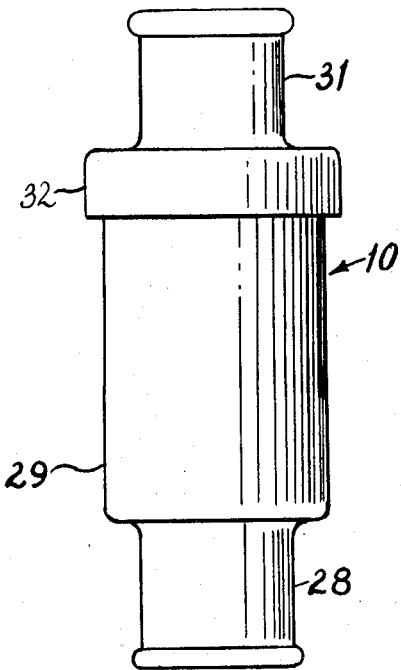
FIG. 6 is an elevational view of the housing employed in said embodiment of the invention.

As may be seen in FIGS. 1 and 6, the housing 10 includes inlet means such as the lower tube 28 communicating with an expanded tubular member 29. As depicted in FIG. 1, a shoulder 30 is formed intermediately of the lower tube 28 and expanded tubular member 29.

The housing 10 also includes outlet means such as the upper tube 31 communicating with an expanded tubular member 32 which is frictionally engaged with the expanded tubular member 29. If desired, the tubular members 29, 32 may be sealed by means of a suitable adhesive such as depicted by the numeral 33 in FIG. 1.

A shoulder 34 is disposed intermediately of the upper tube 31 and expanded tubular member 32, as may also be seen in FIG. 1.

It will be observed that the expanded tubular members 29, 32 and shoulders 30, 34 define a chamber, generally designated by the numeral 35 and communicating with the said upper and lower tubes 31, 28.

The flange 14 is abuttable against the shoulder 30. The spring 12 is seatable on the flange 14 and radial extensions 26. The cylindrical body 11 is slidably receivable within the upper tube 31, the spring 12 also being abuttable against the shoulder 34 when the cylindrical body 13 is received within said upper tube 31.

Figure 7:
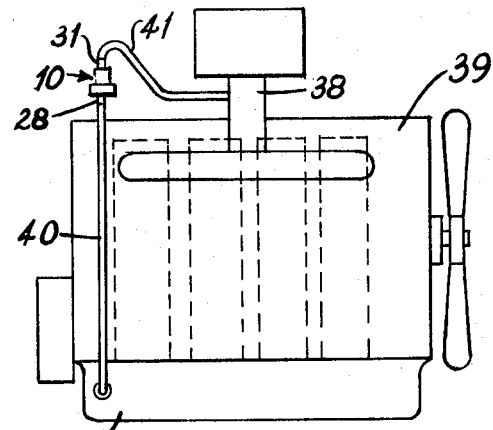
FIG. 7 is a diagrammatic view of an engine employing the said embodiment of the invention.

As may be seen in FIG. 7, the housing 10 is disposed intermediately of the crankcase 36 and intake manifold 38 of a carburetor, which communicates with the combustion cylinders in an engine block 39, the inlet tube 28 being connected to the crankcase 36 by suitable conduit 40, and the outlet tube 31 also being connected to said intake manifold 38 by suitable conduit 41.

With the foregoing arrangement, it will be seen that when the engine is turning over slowly so as to produce a high vacuum in the combustion cylinders, which is communicated to the tube 31, the cylindrical body 13 will be urged against the bias of the spring 12 and into slidable engagement with the said tube 31, thereby retracting the grooves 20, 16 within the tube 31 and sealing them against communication with the interior of the chamber 35. Thus, the flow of air from the crankcase 36 through the housing 10 will be restricted or prevented depending upon the extent of the vacuum and the position assumed by the poppet 11 within the tube 31. With a very high vacuum, the grooves 20, 16 will be entirely retracted within said tube 31, thereby sealing said grooves 20, 16 against all airflow therethrough. With a lesser vacuum, the spring 12 will partially project the cylindrical body 13 from the tube 31 and into the chamber 35, thereby exposing the grooves 16, 20 within said chamber 35 and permitting communication of air from the chamber 35 to the said grooves 16, 20 and thence to the tube 31. When only the grooves 16 are exposed, a small, constant flow of air therethrough will be permitted even though there may be a slight variation in the elevation of the cylindrical body 13. However, upon exposure of the grooves 20, correspondingly greater airflow will be permitted, such airflow being permitted to increase as the cylindrical body 13 is projected from the tube 31, and into the chamber 35.

When the engine is turning over rapidly, the vacuum in the cylinders will be slight, thereby permitting the spring 12 to project the cylindrical body 13 entirely out of the tube 31 and into the chamber 35, where said cylindrical body 13 may assume the position depicted in FIG. 1, this corresponding to a fully open position of the valve which permits air and any accompanying fumes to flow from the crankcase 36 through the tube 28, chamber 35 and tube 31.

During the foregoing action of the spring 12, it is seated against the shoulder 34 and the extension member 15 projects into the tube 31 so as to assure guidance of the cylindrical body 13 into the tube 31 whenever said cylindrical body 13 is again urged towards said tube 31.

In short, the foregoing arrangement provides a reciprocable poppet 11 which prevents airflow through the housing or permits constant or variable airflow therethrough, in response to upstream vacuum, or pressure differential, communicated to the tube 31.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

I claim:

1. A valve for controlling the venting of fumes comprising:
   a housing having a chamber, an inlet and an outlet;
   a longitudinally extending cylindrical control member in said chamber,
   said control member (1) being dimensioned to slidably engage said outlet throughout the circumference of said control member, (2) being spring-biased in an open position, (3) having its circumference interrupted by a plurality of longitudinally extending grooves thereon, each groove including a region of relatively constant cross section leading into a tapered, outwardly flaring region of said groove, for channeling the venting of said fumes, and (4) being urged against said spring and into said outlet upon reduction of pressure within said outlet.

2. A valve as defined in claim 1 wherein the end of said control member which is able to slidably engage said outlet has an elongated extension with a maximum cross-sectional diameter delimited by the maximum depth of the tapered regions.

3. A valve as defined in claim 1 wherein the constant cross section of the first mentioned region is rounded.

4. A valve as defined in claim 1 for controlling the ventilation of vapors and fumes in an internal combustion engine between its crankcase and carburetor wherein:
   said housing includes a first tube constituting said outlet and a second tube constituting said inlet, the first and second tubes communicating with respective expanded tubular members partly received one within the other;
   the biasing spring is coiled about said control member on a base flange formed thereon;
   and each longitudinally extending groove of said control member includes said region of relatively constant cross section commencing adjacent said flange and extending uninterruptedly into said tapered section.

5. A valve as defined in claim 1 wherein said housing and said control members are fabricated of a material having the characteristics of polysulfone plastic.